United States Patent
Zheng et al.

(10) Patent No.: US 12,079,734 B1
(45) Date of Patent: Sep. 3, 2024

(54) COMPILATION TIME REDUCTION FOR MEMORY AND COMPUTE BOUND NEURAL NETWORKS

(71) Applicant: Amazon Technologies, Inc., Seattle, WA (US)

(72) Inventors: Hongbin Zheng, San Jose, CA (US); Randy Renfu Huang, Morgan Hill, CA (US); Richard John Heaton, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/878,824

(22) Filed: Aug. 1, 2022

Related U.S. Application Data

(63) Continuation of application No. 16/829,887, filed on Mar. 25, 2020, now Pat. No. 11,461,662.

(51) Int. Cl.
  *G06N 3/10* (2006.01)
  *G06N 3/04* (2023.01)
  *G06N 3/08* (2023.01)

(52) U.S. Cl.
  CPC ............... *G06N 3/10* (2013.01); *G06N 3/04* (2013.01); *G06N 3/08* (2013.01)

(58) Field of Classification Search
  CPC ............... G06N 3/10; G06N 3/04; G06N 3/08
  See application file for complete search history.

(56) References Cited

U.S. PATENT DOCUMENTS

| | | | |
|---|---|---|---|
| 2019/0286972 A1* | 9/2019 | El Husseini | G06N 3/08 |
| 2019/0303743 A1* | 10/2019 | Venkataramani | G06F 9/3834 |
| 2019/0370086 A1* | 12/2019 | Heilper | G06F 1/324 |
| 2020/0249998 A1* | 8/2020 | Che | G06N 3/063 |

OTHER PUBLICATIONS

U.S. Appl. No. 16/829,887, "Notice of Allowance", May 20, 2022, 10 pages.
Jia et al., "TASO: Optimizing Deep Learning Computation with Automatic Generation of Graph Substitutions", Proceedings of the 27th ACM Symposium on Operating Systems Principles, Oct. 27, 2019, pp. 47-62.

* cited by examiner

*Primary Examiner* — Chuen-Meei Gan
(74) *Attorney, Agent, or Firm* — Kilpatrick Townsend & Stockton LLP

(57) ABSTRACT

Techniques for reducing a compilation time for compiling a neural network are disclosed. A description of a neural network is received by a compiler. A plurality of operators are identified based on the description of the neural network. A plurality of subgraphs are formed, each including one or more operators. For each subgraph, a performance factor is calculated based on a compute usage and a memory usage associated with the operators included in the subgraph. The performance factor is compared to a threshold. Based on the comparison, either the subgraph is classified as a compute bound subgraph and a set of memory optimizations are suppressed or the subgraph is classified as a memory bound subgraph and a set of compute optimizations are suppressed.

14 Claims, 11 Drawing Sheets

COMPILATION TIME REDUCTION FOR MEMORY AND COMPUTE BOUND NEURAL NETWORKS

CROSS REFERENCE TO RELATED APPLICATIONS

This application is a Continuation of and claims priority to U.S. application Ser. No. 16/829,887, filed Mar. 25, 2020, issued as U.S. Pat. No. 11,461,662 on Oct. 4, 2022, and titled "COMPILATION TIME REDUCTION FOR MEMORY AND COMPUTE BOUND NEURAL NETWORKS," the contents of which are herein incorporated in its entirety.

BACKGROUND

Artificial neural networks, which are often simply referred to as neural networks, are computing systems with architectures based on biological neural networks. Neural networks can be trained using training data to learn how to perform certain tasks, such as identifying or classifying physical objects, activities, characters, etc., from images or videos. A neural network, such as a deep neural network, may include multiple layers of processing nodes. Each processing node in a layer can perform computations on input data generated by processing nodes in the preceding layer to generate output data. For example, a processing node may perform a set of arithmetic operations such as multiplications and additions to generate an intermediate output, or perform post-processing operations on the intermediate output to generate a final output. A neural network may include thousands or more of processing nodes and millions or more of parameters.

The architecture of a neural network may include an input layer, an output layer, and a number of intermediate layers, often referred to as hidden layers. Each layer executes a computation on the outputs of the previous layer, with the last layer (the output layer) providing a final result. With more layers, a neural network can, theoretically, perform more complex tasks, such as language translations and identifying (or classifying) the contents of an image. A neural network with more than three hidden layers is sometimes referred to as a deep neural network. Deep neural networks can have many hidden layers, such as, for example, between five and more than a thousand layers.

Neural networks can be implemented using a central processing unit (CPU) to perform the computations. CPUs, however, tend to be optimized for sequential rather than parallel computations, and thus can suffer from poor response times. Graphics processing units (GPUs) are optimized for parallel computations, but not necessarily for the result from one computation unit to be provided directly to another computation unit. Often, the result must first be written to a memory and then read back. Although GPUs can have better response times than CPUs, it would still be desirable to improve the execution time of a neural network. Recently, special-purpose integrated circuit devices, such as neural network processors or accelerators, have been developed to execute neural networks more efficiently than either CPUs or GPUs.

BRIEF DESCRIPTION OF THE DRAWINGS

Various embodiments in accordance with the present disclosure will be described with reference to the drawings, in which.

DETAILED DESCRIPTION

Figure 1A:
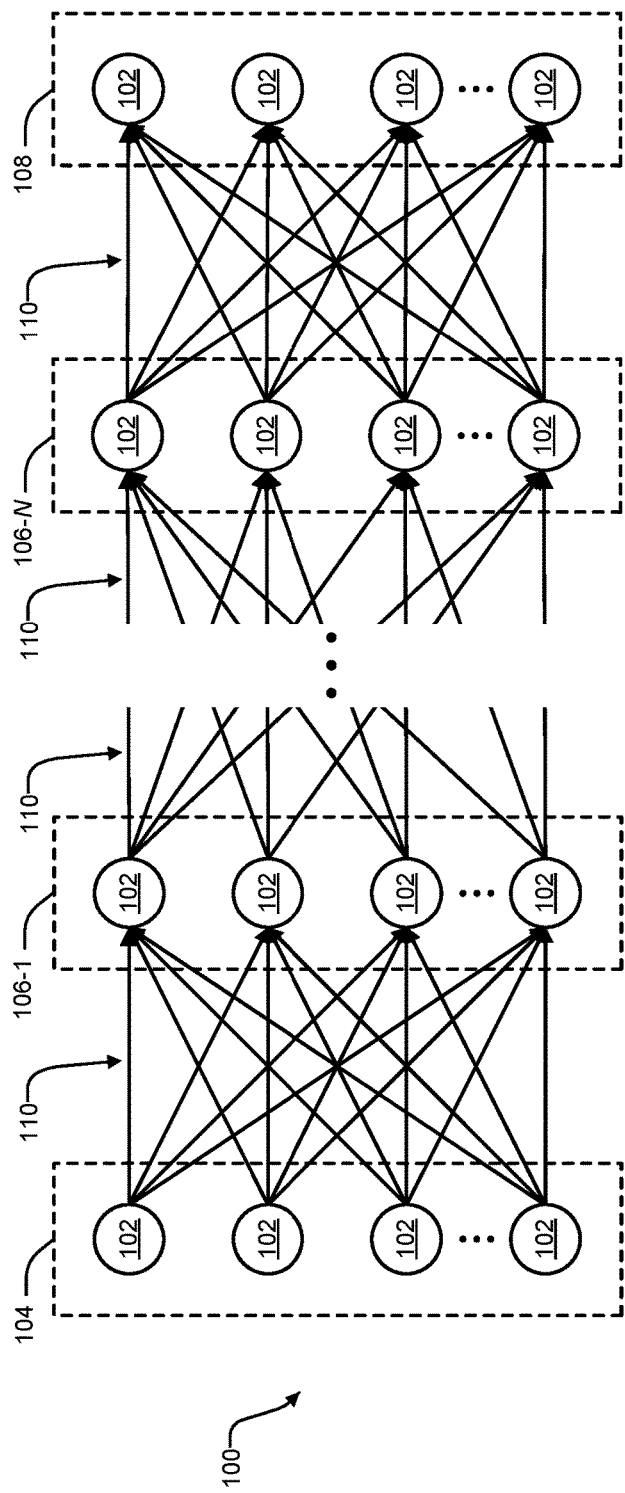
FIGS. 1A and 1B illustrate a detailed example and a corresponding simplified example of a computational flow model for a neural network, respectively.

Neural networks can rely on high utilizations of memory bandwidth and computing resources. For example, implementation of the popular neural network ResNet-50 can require the loading of 23.5 million weights and the execution of more than 5 billion operations. Several improvements in modern processors have aided the ability to handle applications with high memory and compute requirements. For example, as processors have achieved improved performance through, for example, increased clock speeds, various amounts of memory (often referred to as cache memory) have been integrated onto processor chips to improve memory bandwidth. Cache memory is usually organized as a hierarchy of various levels (e.g., L1, L2, L3, etc.), each with different performance and storage capabilities.

Despite improvements to modern processors, many of the operations of a neural network are related to multiply-and-accumulate operations, which are performed poorly by the temporal architectures found in central processing units (CPU) and in graphics processing units (GPU). Such temporal architectures may use a centralized control for a large number of arithmetic logic units (ALUs) in which ALUs can only fetch data from the memory hierarchy but cannot communicate directly with each other. In contrast, special-purpose processors have been designed to include spatial architectures in which ALUs can pass data from one to another directly. These processors, often referred to as neural network processors, have improved both bandwidth and computing capabilities for implementing neural networks and have provided greater flexibility to machine learning engineers.

Along with hardware improvements, various optimizations in the way neural networks are compiled into processor-executable instructions have been developed. Such optimizations may be performed during one or more of a series of passes performed by a compiler. Many of these optimizations may be directed to reducing the bandwidth and/or the computational burden associated with executing the neural network. In one example, the compiler may identify nested loops associated with the neural network and may determine whether two or more nested loops are combinable. This may be accomplished by the compiler gathering data regarding each nested loop, such as the data that is modified by operations within the nested loop, the data that is used in the operations within the nested loop, as well as the ranges of values that are iterated through. Upon determining that two or more nested loops are combinable, the compiler may create a combined nested loop that may include a reduced number of operations and/or memory accesses compared to the pre-combined nested loops.

While compile-time optimizations have improved runtime performance metrics associated with a neural network, such as memory and compute usage, such optimizations have also led to significant increases in compilation times. As such, new techniques for decreasing compilation times or otherwise improving compilation of neural networks are needed.

Embodiments of the present disclosure provide methods, systems, and other techniques for improving compilation of neural networks by turning off, disabling, and/or otherwise suppressing optimizations that have negligible or insufficient effects on runtime performance metrics associated with neural networks. Embodiments may be implemented by a compiler that receives a description of a neural network and generates machine instructions for the neural network to be executed on a processor.

Embodiments described herein may first classify different subgraphs of a neural network as memory bound or compute bound. A subgraph of the neural network may be memory bound when memory bandwidth is the limiting factor and the processor is unable to utilize its full processing capability. Memory bound subgraphs may be those with low compute usage and/or high memory usage. In some instances, memory bound subgraphs may be those with low compute usage in relation to the memory usage. For example, in some instances, a compute-to-load ratio may be calculated by taking the ratio between the compute usage and the memory usage. The compute-to-load ratio may be compared to a predetermined threshold (alternatively referred to as the compute-to-load threshold) to determine whether a subgraph is memory bound by, for example, determining that the compute-to-load ratio is less than the threshold. Alternatively or additionally, a subgraph of the neural network may be classified as memory bound when the majority (e.g., greater than 50%) of the program's runtime is spent waiting for memory requests to be completed. This can occur due to the processor being able to perform the operations faster than the memory controller can satisfy requests for memory.

In contrast, a subgraph of the neural network may be compute bound when processor speed (e.g., the rate at which the processor can perform operations) is the limiting factor and the memory is unable to transfer data at its maximum bandwidth. Compute bound subgraphs may be those with high compute usage and/or low memory usage. In some instances, compute bound subgraphs may be those with high compute usage in relation to the memory usage. For example, the compute-to-load ratio may be compared to the threshold to determine whether a subgraph is compute bound by, for example, determining that the compute-to-load ratio is greater than (or equal to) the threshold. Alternatively or additionally, a subgraph of the neural network may be classified as compute bound when the majority (e.g., greater than 50%) of the program's runtime is spent waiting for operations to be performed by the processor. This can occur due to the memory controller being able to satisfy requests for memory faster than the processor being able to perform the operations.

In some embodiments, the threshold to which the compute-to-load ratio is compared may be determined based on the characteristics of the processor, such as its memory bandwidth and processing speed. As used herein, a processor's memory bandwidth may be expressed in bytes per second and may refer to the maximum rate that data can be transferred to or from a memory associated with (e.g., accessible to and/or integrated with) the processor. For example, a processor's memory bandwidth may be the maximum rate that operations (e.g., instructions) or operands (e.g., weights) can be loaded onto a memory associated with the processor.

As used herein, a processor's processing speed may refer to the maximum rate at which operations can be performed by the processor. The processing speed may be expressed in operations per second, and may optionally employ one or more conventional measures such as floating point operations per second (FLOPS) or instructions per second (IPS). The processing speed can depend on many factors such as the clock rate and the number of instructions that may be performed per clock.

In conjunction with classifying subgraphs of the neural network as memory bound or compute bound, various compile-time optimizations may be classified as memory optimizations and/or compute optimizations. As used herein, memory optimizations may refer to compile-time optimizations that reduce the runtime memory usage associated with executing the neural network on the processor, for example, during an inference. Similarly, as used herein, compute optimizations may refer to compile-time optimizations that reduce the runtime compute usage associated with executing the neural network on the processor.

In accordance with some embodiments of the present disclosure, the compiler may check to determine whether a particular subgraph of the neural network is memory bound or compute bound and may accordingly suppress memory optimizations or compute optimizations. In some embodiments, prior to performing any optimizations, the compiler may calculate the compute-to-load ratio for each subgraph of the neural network. While parsing through different subgraphs, and upon reaching a particular subgraph, the compiler may check the previously calculated compute-to-load ratio for the subgraph to determine whether an optimization is to be suppressed. For example, prior to performing a memory optimization for a subgraph, the compiler may compare the previously calculated compute-to-load ratio for the subgraph to the compute-to-load threshold to determine whether the compute-to-load ratio is less than the compute-to-load ratio threshold. If it is, the compiler may perform the memory optimization. Otherwise, the compiler may proceed without performing the memory optimization. As another example, prior to performing a compute optimization for a subgraph, the compiler may compare the previously calculated compute-to-load ratio for the subgraph to the compute-to-load threshold to determine whether the compute-to-load ratio is greater than the compute-to-load ratio threshold. If it is, the compiler may perform the compute optimization. Otherwise, the compiler may proceed without performing the compute optimization.

In some embodiments, the compiler may calculate the compute-to-load ratio for a particular subgraph upon reaching the particular subgraph. In one example, while parsing through subgraphs, and upon reaching a particular subgraph, the compiler may calculate the compute-to-load ratio for the subgraph to determine (e.g., by comparing the ratio to the compute-to-load threshold) whether the subgraph is memory bound, compute bound, or neither. If the subgraph is classified as memory bound, the compiler may perform memory optimizations for the subgraph but may proceed without performing compute optimizations for the subgraph. If the subgraph is classified as compute bound, the compiler may perform compute optimizations for the subgraph but may proceed without performing memory optimizations for the subgraph.

In some embodiments, prior to performing any optimizations, the compiler may calculate the compute-to-load ratio for each operator of the neural network. Additionally or alternatively, the compiler may group similar operators, such as those having a same operator type, and may form subgraphs of similar operators. For example, neural networks can include many interconnected operators of several different operator types. Operators of the same type may perform similar operations on the input data. For example, one type of operator may be an addition operator that adds two tensors together. Another type of operator may be a convolution operator that convolves an input tensor with a filter, which is characterized by a set of weights. While two convolution operators may perform operations that are structurally similar on their respective input tensors, the operations differ by the particular weights of each convolution operation. In some cases, neural networks may include only a few different types of operators.

In some embodiments, prior to performing any optimizations, the compiler may analyze the description of the neural network and identify a plurality of operators. The compiler may also identify an operator type for each of the operators. Based on the operator types, the compiler may form a plurality of subgraphs, each including one or more operators of a similar operator type and/or having similar tendencies to be memory bound or compute bound. The compiler may then calculate a performance factor indicative of memory usage and/or compute usage for each of the subgraphs. The performance factor may be the compute-to-load ratio. The compiler may then suppress memory optimizations or compute optimizations for each of the subgraphs based on the performance factor by, for example, comparing the performance factor to a threshold, such as the compute-to-load threshold. While parsing through the operators, the compiler may skip suppressed optimizations and perform optimizations that have not been suppressed.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1B:
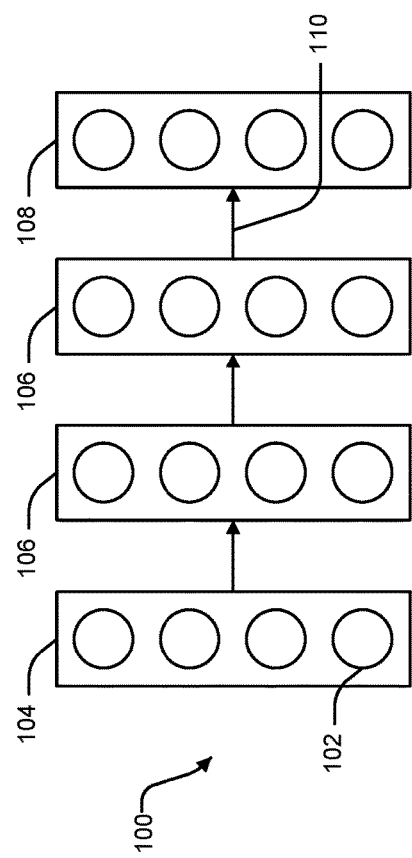

FIGS. 1A and 1B illustrate a detailed example and a corresponding simplified example of a computational flow model for a neural network 100, respectively. Neural networks take inspiration from the mechanics of the operation of the human brain. According to various models of the brain, the main computational element of the brain is the neuron. Neurons are connected together with a number of elements, with elements entering a neuron being referred to as dendrites and an element leaving a neuron being referred to as an axon. A neuron accepts signals via dendrites, performs a computation on the signals, and outputs a signal on an axon. The input and output signals are referred to as activations. The axon of one neuron can branch out and be connected to the dendrites of multiple neurons. The connection between a branch of an axon and a dendrite is called a synapse.

A synapse can scale the signal crossing the synapse. The scaling factor is referred to as a weight, and is thought of as the way a brain is able to learn: different weights result from different responses to input. Learning can change the weights, but the organization of the neurons and synapses need not change to obtain the learning. The static structure of the brain can thus be used as a model for a program, and the weights can reflect tasks that the program has learned to perform.

Neural networks operate on the notion that a neuron's computation involves a weighted sum of input values. These weighted sums correspond to the value scaling performed by the synapses and the combining of those values in the neuron. A functional operation is performed in the neuron on the combined inputs. In the brain model, the operation appears to be a non-linear function that causes the neuron to generate an output only when the inputs cross some threshold. Thus, by analogy, the nodes of a neural network can apply a non-linear function to the weighted sum of the values input into the nodes.

In the illustrated example, the neural network 100 includes an input layer 104, one or more middle layers that are often referred to as hidden layers 106, and an output layer 108. Each layer includes some number of nodes 102. In this example, the nodes 102 of the input layer 104 are connected to each node 102 of the hidden layers 106. The connections, which would be referred to as synapses in the brain model, are referred to as weights 110. Also in this example, each node 102 of the hidden layer 106 has a connection or weight 110 with each node 102 of the output layer. The input layer 104 can receive inputs and can propagate the inputs to the hidden layer 106. A neural network implementation can include multiple hidden layers. Weighted sums computed by the hidden layers 106 are propagated to the output layer 108, which can present final outputs to a user. The outputs of the nodes 102 can be referred to as activations, in keeping with the brain model.

An example of a computation that can occur at each layer in the example neural network 100 is as follows:

$$y_j = f\left(\sum_{i=1}^{3} W_{ij} \times x_i + b\right)$$

In the above equation, $W_{ij}$ is a weight, $x_i$ is an input activation, $y_j$ is an output activation, $f(\ )$ is a non-linear function, and b is a bias term. Various non-linear functions can be used to achieve different purposes.

The model of the neural network 100 can be referred to as a directed, weighted graph. In a directed graph, each connection to or from a node indicates a direction (e.g., into the node or away from the node). In a weighted graph, each connection can have a weight. Tools for developing neural networks can visualize the neural network as a directed, weighted graph, for ease of understanding and debuggability. In some cases, these tools can also be used to train the neural network and output trained weight values. Executing the neural network is then a matter of using the weights to conduct computations on input data.

Neural networks with many layers can be capable of learning high-level features having more complexity and abstraction than shallower networks. As an example, a neural network can be taught to recognize images. In this example, pixels of an image can be fed into the input layer of the neural network, and the outputs of the first layer can indicate the presence of low-level features in the image, such as lines and edges. At subsequent layers, these features can be combined to measure the likely presence of higher level features: the lines can be combined into shapes, which can be further combined into sets of shapes. Given all this information, the neural network can output a probability that the high-level features represent a particular object or scene. For example, the neural network can output whether an image contains a cat or does not contain a cat.

The learning phase of a neural network is referred to as training the neural network. During training, the neural network is taught to perform a task. In learning the task, values for the weights (and possibly also the bias) are determined. The underlying program for the neural network (e.g., the organization of nodes into layers, the connections between the nodes of each layer, and the computation executed by each node), does not need to change during training. Once trained, the neural network can perform the task by computing a result using the weight values that were determined during training. For example, the neural network can output the probability that an image contains a particular object, can output the probability that an audio sequence contains a particular word, can generate a bounding box around an object in an image, or can propose an action that should be taken, etc. Running the program for the neural network is referred to as inference.

There are multiple ways in which weights can be trained. One method is called supervised learning. In supervised learning, all training samples are labeled, so that inputting each training sample into a neural network produces a known result. Another method is called unsupervised learning, where the training samples are not labeled and training aims to find a structure in the data or clusters in the data. Semi-supervised learning falls between supervised and unsupervised learning. In semi-supervised learning, a subset of training data is labeled. The unlabeled data can be used to define cluster boundaries and the labeled data can be used to label the clusters.

FIGS. 2A-2F illustrate various examples of forming subgraphs comprising the nodes 102 (and their corresponding operators) of the neural network 100 in accordance with some embodiments of the present disclosure. In some embodiments, subgraphs may be formed and thereafter classified as a memory bound subgraph or as a compute bound subgraph for purposes of suppressing and/or performing certain optimizations on the operators contained therein.

Figure 2A:
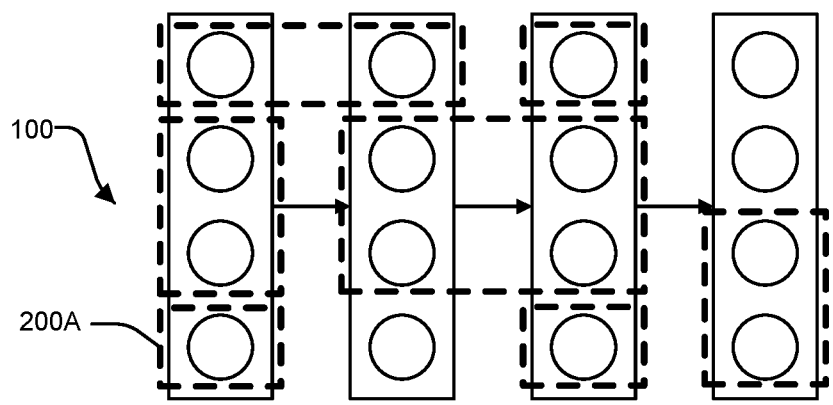
FIGS. 2A-2F illustrate various examples of forming subgraphs comprising nodes (and their corresponding operators) of a neural network.

In reference to FIG. 2A, a set of subgraphs 200A are formed on the operators of the neural network 100. As shown in the illustrated example, each of the subgraphs 200A may include a single or multiple nodes/operators. The nodes/operators in each of the subgraphs 200A may belong to the same layer or different layers of the neural network 100. While in some embodiments each and every node/operator of the neural network 100 may be included in one of the subgraphs 200A, in some embodiments one or more nodes/operators may not be included in any of the subgraphs 200A.

Figure 2B:
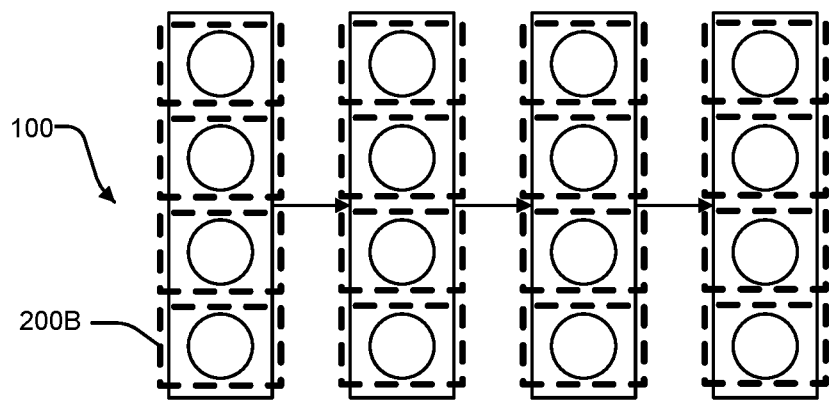
Figure 2C:
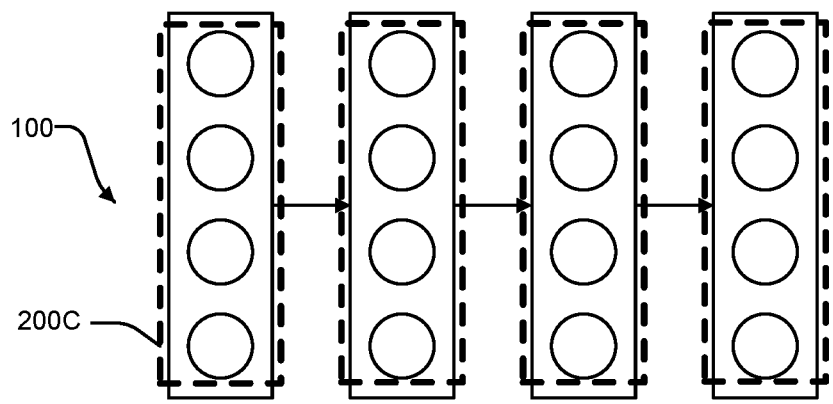

In reference to FIG. 2B, a set of subgraphs 200B are formed on the operators of the neural network 100, with each subgraph only containing a single node/operator. In reference to FIG. 2C, a set of subgraphs 200C are formed on the operators of the neural network 100, with subgraphs corresponding to layers such that each of subgraphs 200C contains all the operators of a single layer of the neural network 100.

Figure 2D:
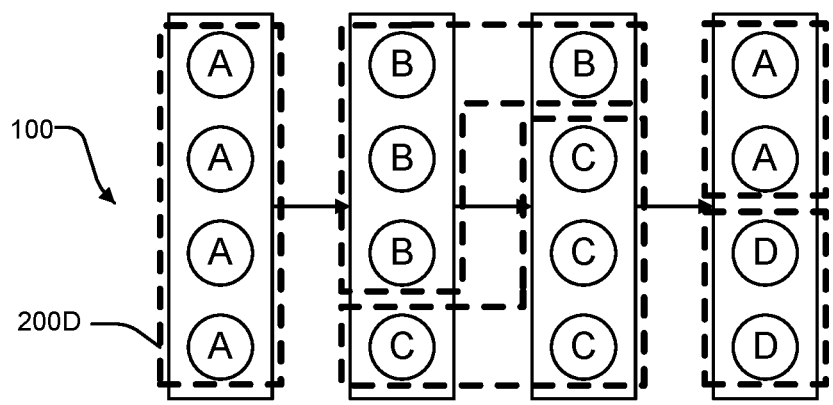

In reference to FIG. 2D, a set of subgraphs 200D are formed on the operators of the neural network 100 based on operator type. For example, the compiler may determine the operator type for each of the operators of the neural network 100 and may group operators having the same operator type. In the illustrated example, 4 operators of operator type "A" are grouped together to form one subgraph, 4 operators of operator type "B" are grouped together to form another subgraph, 4 operators of operator type "C" are grouped together to form another subgraph, 2 operators of operator type "A" are grouped together to form another subgraph, and 2 operators of operator type "D" are grouped together to form another subgraph. In some instances, only operators that are connected via data dependencies that are of the same operator type are grouped together to form a subgraph. Thus, in the illustrated example, the 6 operators of operator type "A" may not be grouped together since they are not directly connected via data dependencies.

Figure 2E:
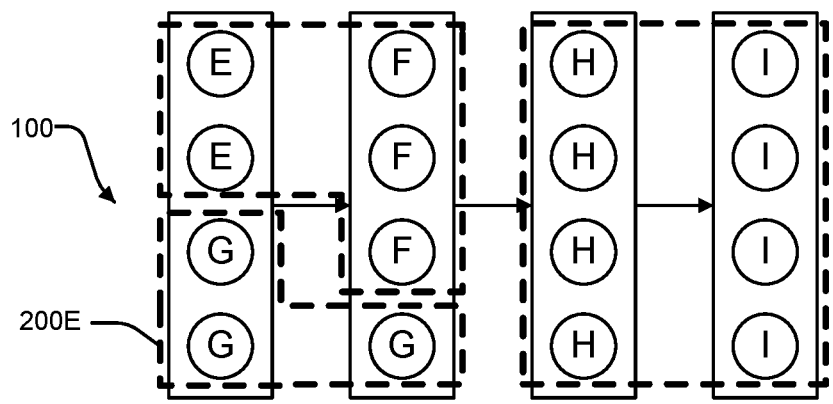

In reference to FIG. 2E, a set of subgraphs 200E are formed on the operators of the neural network 100 based on operator type. The example illustrated in FIG. 2E differs from the example illustrated in FIG. 2D in that similar operator types are grouped together in addition to identical operator types. For example, prior to forming the subgraphs 200E, it may be determined that operator type "E" is similar to operator type "F" and that operator type "H" is similar to operator type "I". Similarity between operator types may be determined based on similar memory usage and/or compute usage characteristics. In the illustrated example, 2 operators of operator type "E" are grouped together with 3 operators of operator type "F" to form one subgraph, 3 operators of operator type "G" are grouped together to form another subgraph, and 4 operators of operator type "H" are grouped together with 4 operators of operator type "I" to form another subgraph.

Figure 2F:
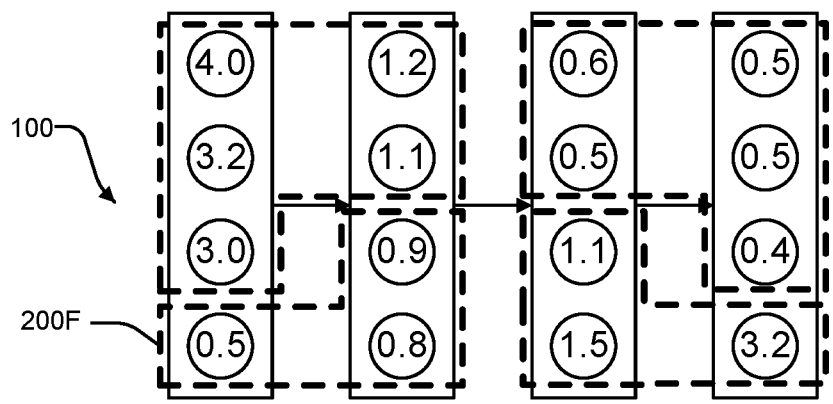

In reference to FIG. 2F, a set of subgraphs 200F are formed on the operators of the neural network 100 based on a calculated performance factor for each operator. The performance factor may be calculated based on the memory usage and/or the compute usage associated with each operator. The calculated performance factors may be compared to a threshold to form subgraphs. In the illustrated example, performance factors are compared to a threshold of 1 and operators connected via data dependencies that have performance factors on the same side of the threshold (e.g., all greater than the threshold or all less than the threshold) are grouped together to form subgraphs.

Figure 3:
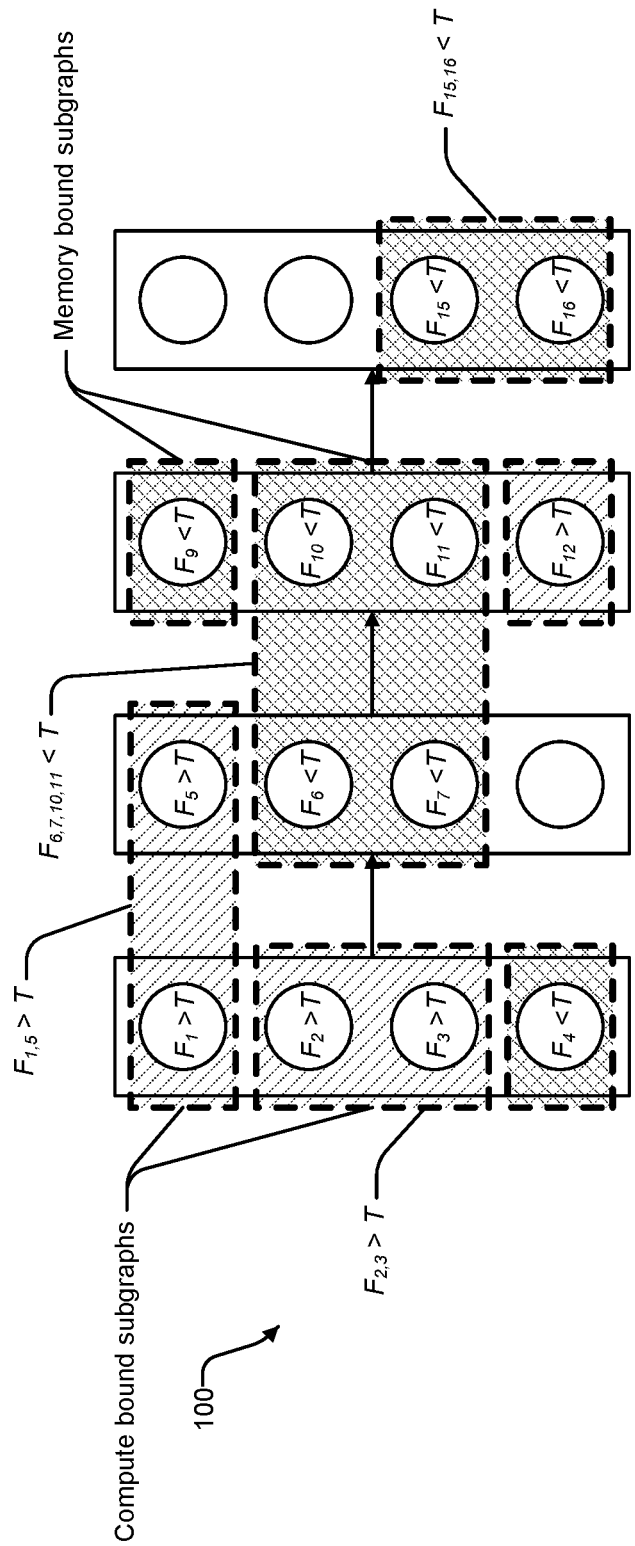
FIG. 3 illustrates an example of forming subgraphs comprising nodes (and their corresponding operators) of a neural network and classifying the subgraphs as memory bound or compute bound.

FIG. 3 illustrates an example of forming subgraphs comprising the nodes 102 (and their corresponding operators) of the neural network 100 and classifying the subgraphs as memory bound or compute bound in accordance with some embodiments of the present disclosure. In the illustrated example, performance factors $F_i$ are calculated for each of the operators of the neural network 100 and subgraphs are formed based on the calculated performance factors by, for example, comparing the performance factors to a threshold T with operators connected via data dependencies that have performance factors on the same side of the threshold grouped together to form subgraphs.

In the illustrated example, subgraphs containing operators with performance factors that are greater than the threshold are classified as compute bound subgraphs, and subgraphs containing operators with performance factors that are less than the threshold are classified as memory bound subgraphs. In some embodiments, based on the method in which the performance factor is calculated, the classification may be opposite of that shown in the illustrated example, such that subgraphs containing operators with performance factors that are greater than the threshold are classified as memory bound subgraphs, and subgraphs containing operators with performance factors that are less than the threshold are classified as compute bound subgraphs.

Figure 4A:
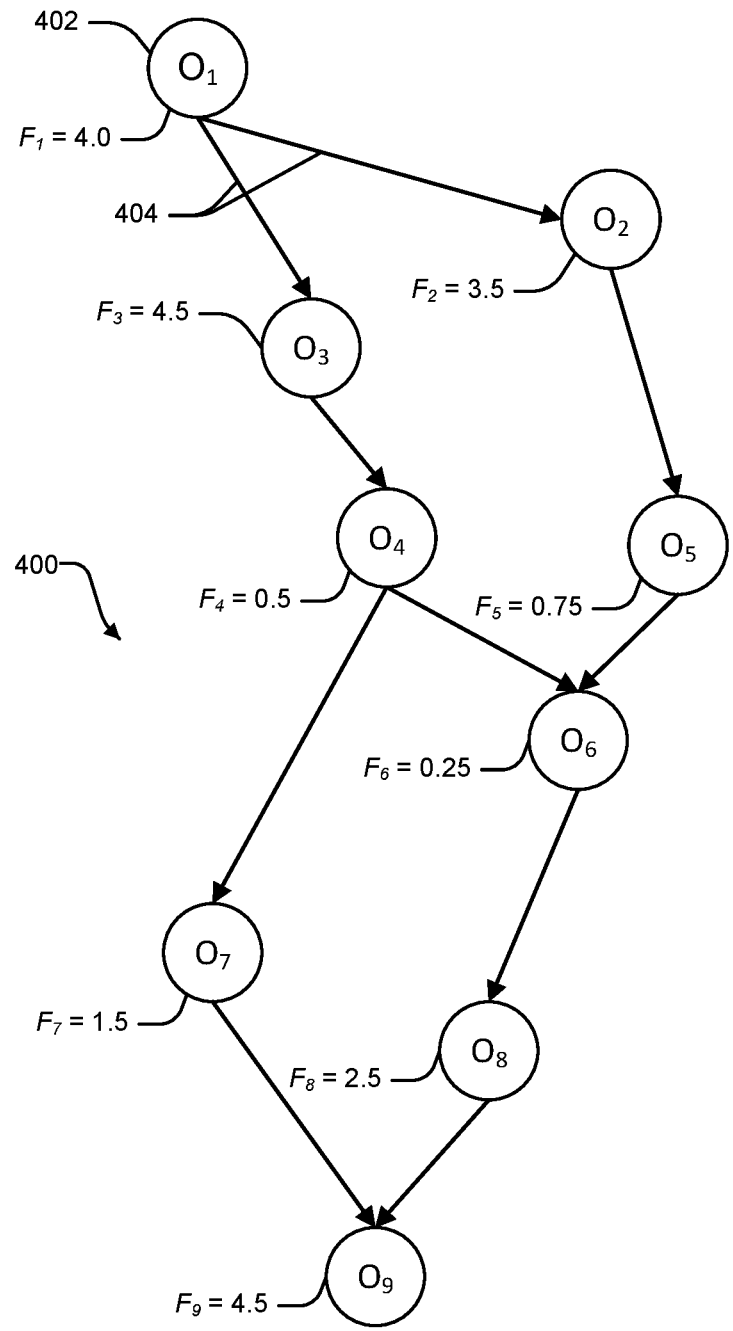
FIGS. 4A and 4B illustrate an example of calculating performance factors for operators of a neural network and forming subgraphs based on the calculated performance factors.
Figure 4B:
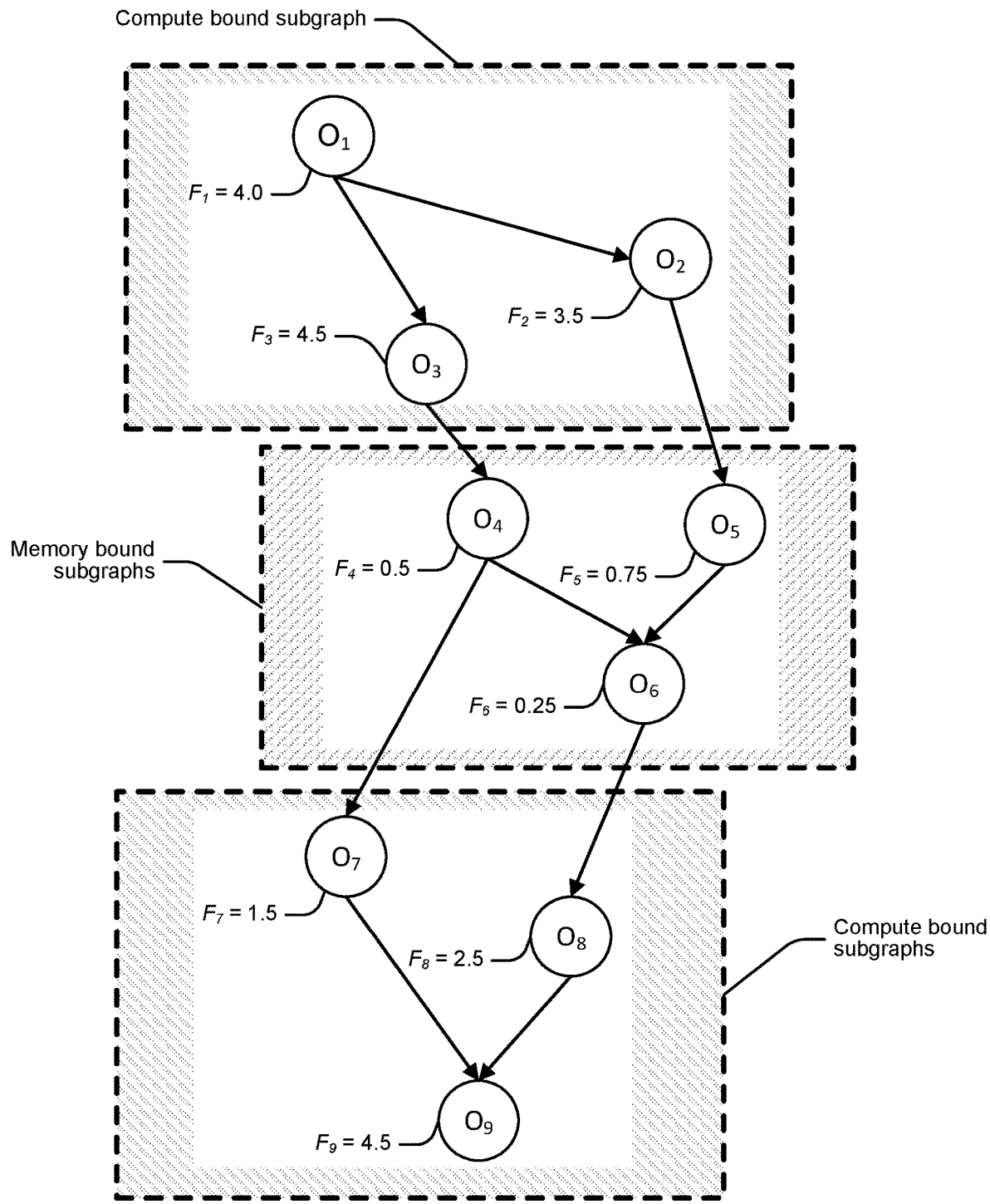

FIGS. 4A and 4B illustrate an example of calculating performance factors for operators 402 of a neural network 400 and forming subgraphs based on the calculated performance factors, in accordance with some embodiments of the present disclosure. The operators 402 are connected via data dependencies 404 that capture the direction of data flow between the operators 402, such that an operator at the beginning of an arrow produces data on which the operator at the end of the arrow operates. In the illustrated example, a performance factor $F_i$ is calculated for each of the operators 402. In some embodiments, the performance factor may be a compute-to-load ratio or an arithmetic intensity factor (which are the same value). The performance factors are compared to a threshold T (e.g., T=1) to determine whether each performance factor is greater than or less than the threshold.

In reference to FIG. 4B, subgraphs are formed based on the calculated performance factors by, for example, grouping operators connected via the data dependencies 404 that have performance factors on the same side of the threshold together. Accordingly, operators $O_1$, $O_2$, and $O_3$, which are connected via the data dependencies 404 and have corresponding performance factors that are greater than the threshold, are grouped together to form a subgraph, which is classified as a compute bound subgraph due the to the performance factors being greater than the threshold. Similarly, operators $O_7$, $O_8$, and $O_9$ are grouped together to form a compute bound subgraph. Operators $O_4$, $O_5$, and $O_6$, which are connected via the data dependencies 404 and have corresponding performance factors that are less than the threshold, are grouped together to form a subgraph, which is classified as a memory bound subgraph due the to the performance factors being less than the threshold.

Figure 5A:
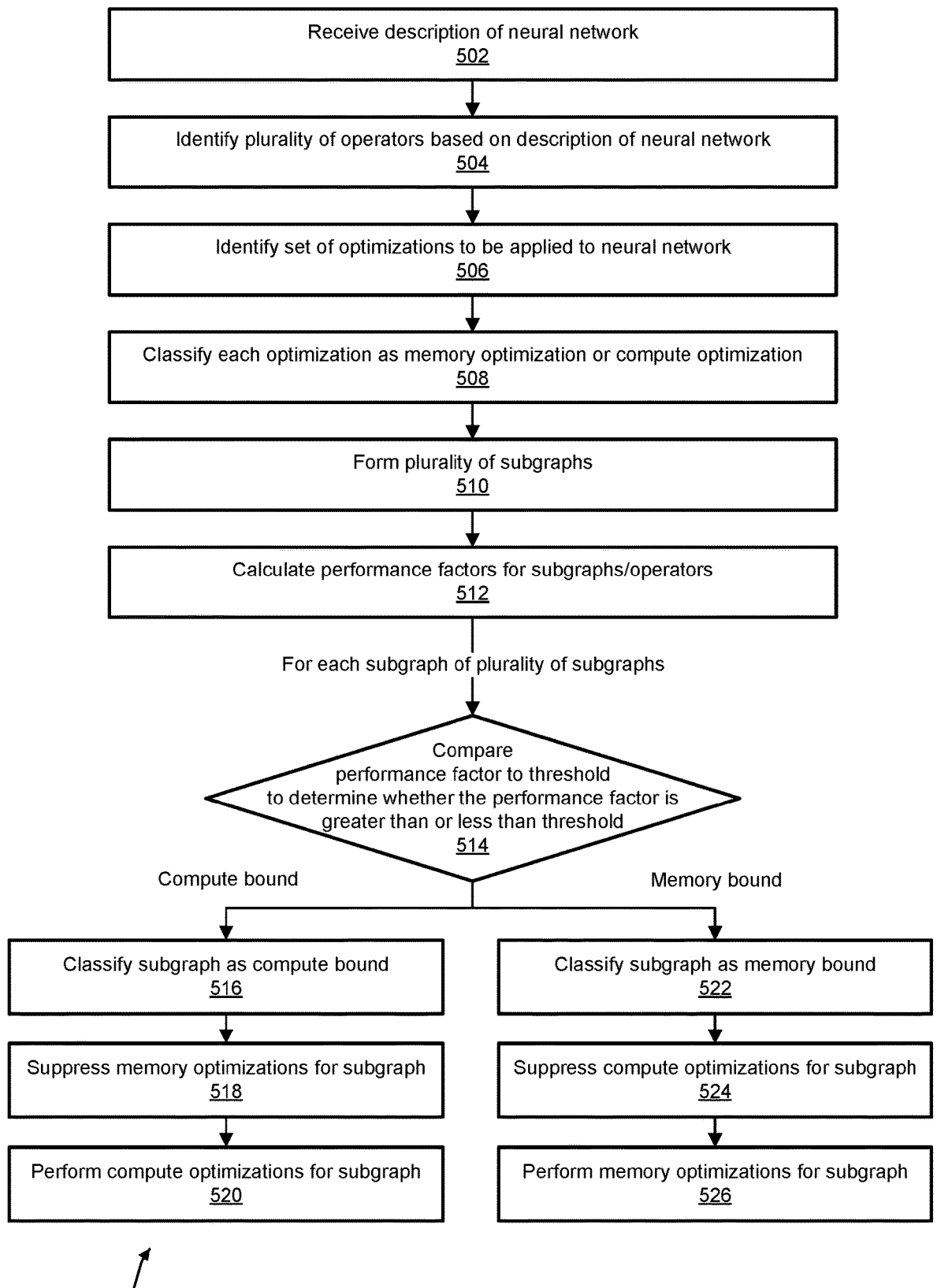
FIGS. 5A and 5B illustrate flowcharts of example methods for reducing a compilation time for compiling a neural network.
Figure 5B:
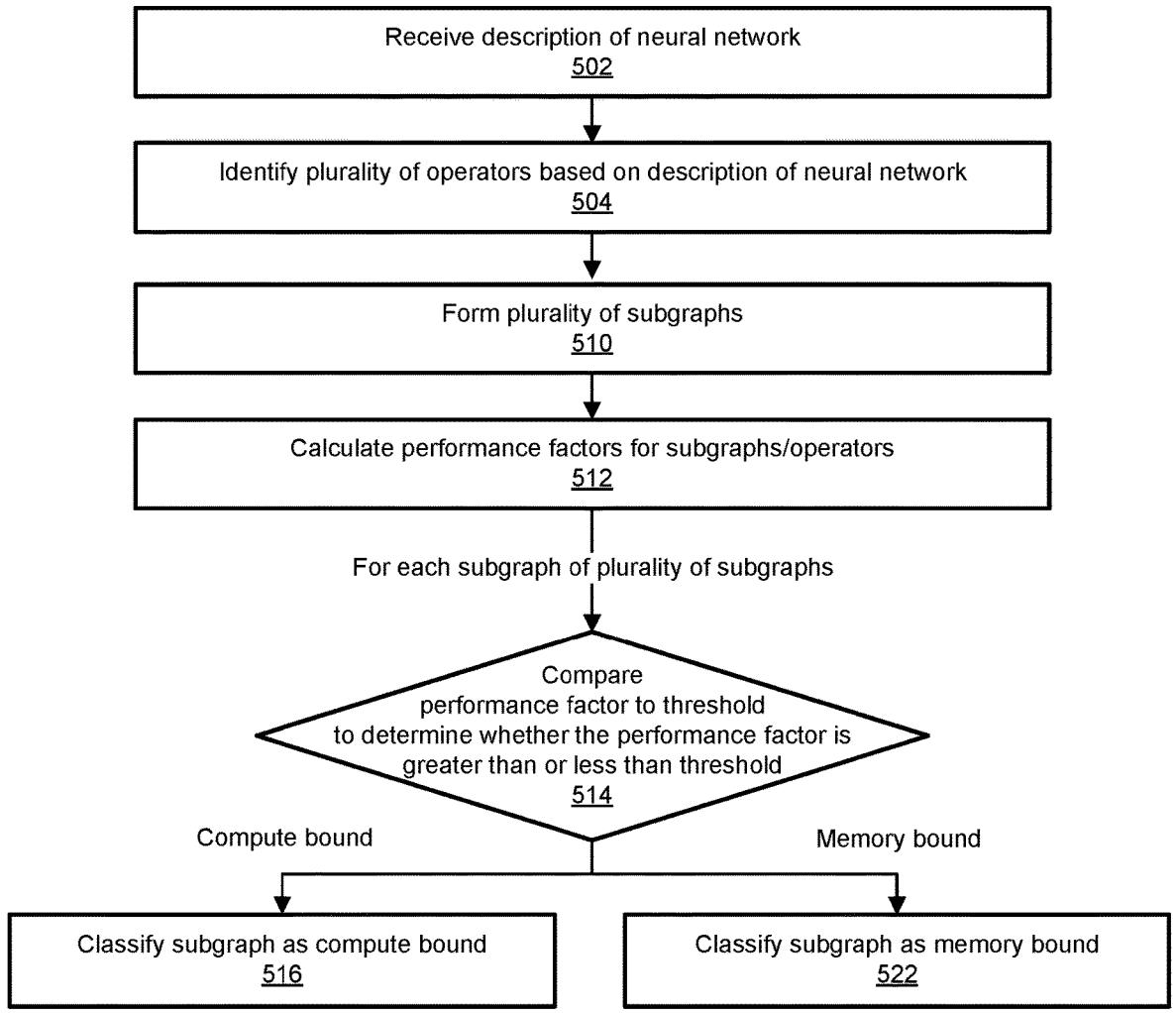

FIGS. 5A and 5B illustrate flowcharts of example methods 500 for reducing a compilation time for compiling a neural network. One or more steps of the methods 500 may be performed in a different order than the illustrated examples, and one or more steps of the methods 500 may be omitted during the performance of the methods 500. One or more steps of the methods 500 may be performed by a compiler running on a host processor. In some instances, the methods 500 can be implemented as a computer-readable medium or computer program product comprising instructions which, when the program is executed by one or more computers, cause the one or more computers to carry out the steps of the method. Such computer program products can be transmitted, over a wired or wireless network, in a data carrier signal carrying the computer program product.

In reference to FIG. 5A and the illustrated method 500A, at step 502, a description of the neural network is received. In some embodiments, the description of the neural network is received by a compiler.

At step 504, a plurality of operators are identified based on the description of the neural network. In some embodiments, the plurality of operators are identified by the compiler. In some embodiments, an operator type associated with each of the plurality of operators is determined.

At step 506, a set of optimizations to be applied to (e.g., performed on) the neural network are identified. Each of the set of optimizations may be identified prior to any of the optimizations being performed or, in some embodiments, each of the set of optimizations may be identified prior to that particular optimization being performed. For example, immediately prior to an optimization being performed for an operator or a group of operators, the optimization may be identified. Identifying the set of optimizations may include determining a name and/or a performed process for each of the set of optimizations. In some instances, a list of names for the set of optimizations may be generated. In some embodiments, the set of optimizations to be applied to the neural network are identified by the compiler.

At step 508, each of the set of optimizations is classified as a memory optimization or a compute optimization. In some embodiments, an optimization may be classified as a memory optimization if the optimization improves memory usage. For example, an optimization may be classified as a memory optimization if the optimization causes less data to be transferred/loaded between memories during runtime. In some embodiments, an optimization may be classified as a compute optimization if the optimization improves compute usage. For example, an optimization may be classified as a compute optimization if the optimization causes fewer operations to be performed during runtime and/or results in less computationally intensive operation(s) during runtime.

Each of the set of optimizations may be classified prior to any of the optimizations being performed or, in some embodiments, each of the set of optimizations may be classified prior to that particular optimization being performed. For example, immediately prior to an optimization being performed for an operator or a group of operators, the optimization may be classified. In some embodiments, an optimization may be classified as either a memory optimization or a compute optimization, but not both. In some embodiments, an optimization may be classified as neither a memory optimization nor a compute optimization. In some embodiments, classifying the set of optimizations produces a set of memory optimizations and a set of compute optimizations. In some embodiments, the set of optimizations may be classified by the compiler.

At step 510, a plurality of subgraphs are formed, with each of the plurality of subgraphs including one or more operators of the plurality of operators. In various embodiments, the plurality of subgraphs may be formed based on one or more of: the operator types of the plurality of operators, the layers of the neural network, the data dependencies of the neural network, the calculated performance factors of the plurality of operators, and the like. In some embodiments, the number of operators included in each of the subgraphs may not be restricted to a single operator or to particular number of operators such that subgraphs may include varying numbers of operators.

At step 512, a performance factor is calculated for each subgraph and/or for each operator. The performance factor may be calculated based on a compute usage and/or a memory usage associated with the subgraph and/or the operator(s) for which the performance factor is calculated. For example, if the performance factor is calculated for a single operator, then the performance factor may be calculated based on the compute usage and/or the memory usage associated with that single operator, for example, when the single operator is executed on a target processor during runtime. As another example, if the performance factor is calculated for a group of operators of a subgraph, then the performance factor may be calculated based on the compute usage and/or the memory usage associated with those operators in the group, for example, when the operators are executed on the target processor during runtime. As another example, if the performance factor is calculated for a subgraph, then the performance factor may be calculated based on the compute usage and/or the memory usage associated with one or more operators in the subgraph, for example, when the one or more operators are executed on the target processor during runtime. In some embodiments, the performance factors are calculated by the compiler.

The performance factor may be calculated based only on the memory usage of operator(s), only on the compute usage of operator(s), or based on both the memory usage and the compute usage of operator(s). In some embodiments, the performance factor is a compute-to-load ratio that may be calculated as the ratio between the compute usage and the memory usage (e.g., the compute usage divided by the memory usage). In some embodiments, the performance factor is an arithmetic intensity factor that may be calculated as the number of operations (e.g., floating point operations) performed by a given code relative to the amount of memory accesses that are required to support those operations.

In some examples, step 512 may be performed after or prior to step 510. For example, in some embodiments the performance factor may be calculated for each operator of the plurality of operators prior to the formation of subgraphs or the performance factors may be calculated after the formation of subgraphs. In some instances, subgraphs may be formed based on the calculated performance factors, as described in reference to FIGS. 4A and 4B. In some embodiments, steps 510 and step 512 may be performed concurrently and/or repeatedly. For example, performance factors may be calculated for a first subset of operators which may be combined into a first subgraph, which may be followed by the calculation of performance factors for a second subset of operators which may be combined into a second subgraph, and so on.

At step 514, the calculated performance factors are compared to a threshold to determine whether the calculated performance factors are greater than or less than the threshold. The threshold may be set (e.g., calculated) based on a memory capability and/or a compute capability of the target processor on which the plurality of operations are to be executed during runtime. For each of the subgraphs, if the performance factor(s) are greater than the threshold (or less than the threshold, depending on the definition of the performance factor), the method 500A proceeds to step 516. If the performance factor(s) are less than the threshold (or greater than the threshold, depending on the definition of the performance factor), the method 500A proceeds to step 522. In some embodiments, the performance factors are compared to the threshold by the compiler.

Prior to performance of step 514, the threshold may be determined (e.g., set). In some embodiments, the threshold may be determined based on a memory capability (e.g., memory bandwidth) and/or a compute capability (e.g., processing speed) of the target processor. For example, the threshold may be calculated as the ratio between the compute capability and the memory capability of the target processor (e.g., the compute capability divided by the memory capability, or the memory capability divided by the compute capability) or as some factor multiplied by the ratio, such as 95%, 90%, 85%, 80%, 75%, 70%, 65%, 60%, 55%, 50%, 45%, 40%, 35%, 30%, 25%, 20%, 15%, 10%, or 5% of the ratio.

At step 516, the subgraph is classified as compute bound and/or as a compute bound subgraph. In some embodiments, the subgraph is classified by the compiler. At step 518, the set of memory optimizations are suppressed for the subgraph. Suppressing the set of memory optimizations for the subgraph may include causing one, more than one, or all of the set of memory optimizations for the subgraph to not be performed. In some embodiments, suppressing the set of memory optimizations for the subgraph may include reducing or altering the set of memory optimizations for the subgraph. In some embodiments, the set of memory optimizations are suppressed for the subgraph by the compiler. At step 520, the set of compute optimizations are performed for the subgraph without suppressing (e.g., reducing or altering) the set of compute optimizations. In some embodiments, the set of compute optimizations are performed for the subgraph by the compiler.

At step 522, the subgraph is classified as memory bound and/or as a memory bound subgraph. In some embodiments, the subgraph is classified by the compiler. At step 524, the set of compute optimizations are suppressed for the subgraph. Suppressing the set of compute optimizations for the subgraph may include causing one, more than one, or all of the set of compute optimizations for the subgraph to not be performed. In some embodiments, suppressing the set of compute optimizations for the subgraph may include reducing or altering the set of compute optimizations for the subgraph. In some embodiments, the set of compute optimizations are suppressed for the subgraph by the compiler. At step 526, the set of memory optimizations are performed for the subgraph without suppressing (e.g., reducing or altering) the set of memory optimizations. In some embodiments, the set of memory optimizations are performed for the subgraph by the compiler.

In reference to FIG. 5B and the illustrated method 500B, at step 502, a description of the neural network is received, similar to that described in reference to the method 500A. At step 504, a plurality of operators are identified based on the description of the neural network, similar to that described in reference to the method 500A. At step 510, a plurality of subgraphs are formed, similar to that described in reference to the method 500A. At step 512, a performance factor is calculated for each subgraph and/or for each operator, similar to that described in reference to the method 500A. At step 514, the calculated performance factors are compared to a threshold to determine whether the calculated performance factors are greater than or less than the threshold, similar to that described in reference to the method 500A. At step 516, the subgraph is classified as compute bound and/or as a compute bound subgraph, similar to that described in reference to the method 500A. At step 522, the subgraph is classified as memory bound and/or as a memory bound subgraph, similar to that described in reference to the method 500A.

Figure 6:
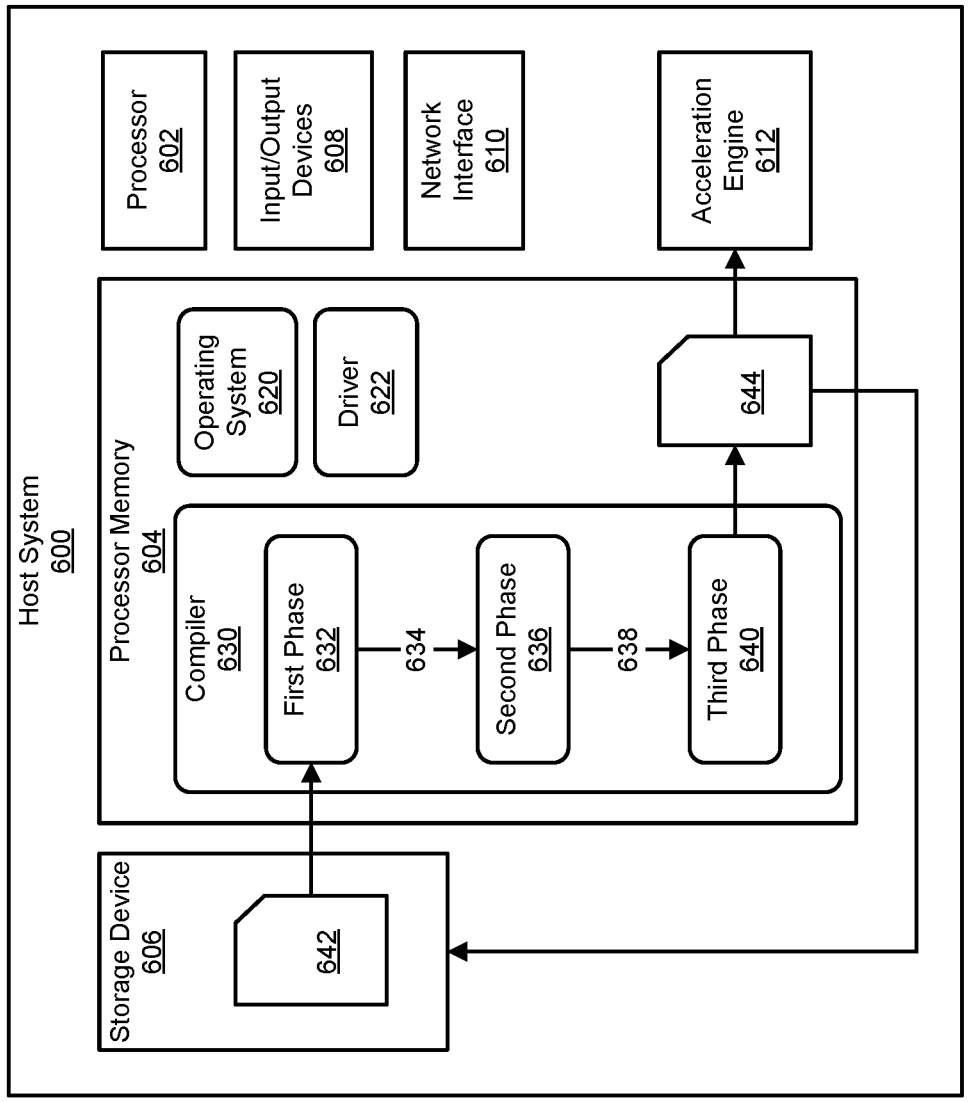
FIG. 6 illustrates a block diagram of an example of a host system.

FIG. 6 illustrates a block diagram of an example of a host system 600 on which a compiler, such as is described herein, can run. The illustrated host system 600 is an example of a computing device, and includes a processor 602, a processor memory 604, at least one storage device 606, various Input/Output (I/O) devices 608, and at least one network interface 610. In the example of FIG. 6, the host system 600 also includes an acceleration engine 612, which is an integrated circuit device that can accelerate certain operations or computations performed by the host system 600. In various examples, the host system 600 can be implemented as a server in a data center, a desktop computer, a laptop computer, a tablet computer, or a smartphone, among other examples. In some examples, operations or components discussed below as performed or included in the host system 600 can be performed or included in other computer devices. For example, the compiler 630 can execute on the host system 600 while the acceleration engine 612 is located at a different host system.

The processor 602 is an integrated circuit device that can execute program code, in the form of instructions. The program code can be used for various software applications or tools, such as an operating system 620 or the illustrated compiler 630. While the processor 602 is executing a program, the instructions for the program can be stored in the processor memory 604. The instructions can also be stored elsewhere, such as on the storage device 606, and can be loaded into the processor memory 604 when needed by the processor 602. The processor 602 can also use the processor memory 604 for temporary storage of other data on which the processor 602 is operating. In various examples, the processor memory 604 is a volatile memory type, such as a type of Random Access Memory, though non-volatile memory types can, alternatively or additionally, be used for the processor memory 604.

The storage device 606 is an example of a device that can include non-volatile memory. For example, the storage device 606 can be a magnetic disk drive, a solid state drive, or an optical drive, among other examples. The storage device 606 can further be non-transitory, such that program code and other data stored on the storage device 606 remains present when the storage device 606 is not powered on.

The storage device 606 is one example of a peripheral device, which are components that can be coupled to the host system 600 to add functionality to the host system 600. Other examples of peripheral devices include the Input/Output devices 608 and the network interface 610. The Input/Output devices 608 can include user input and output devices, such as keyboards, mice, touch screens, microphones, display screens, speakers, printers, and scanners, among other examples. The network interface 610, which can be implemented using a network interface card, can provide access to one or more networks. The network interface 610 can include, for example, a physical port for connecting a network cable and/or wireless antennas for communicating with Wi-Fi and/or cellular networks. The network interface 610 can also be described as an I/O device.

The acceleration engine 612 is also another type of peripheral device or I/O device. The acceleration engine 612 is a device that is purpose built to perform certain operations that can be performed by the processor 602, but can be performed faster by the acceleration engine 612. For example, the acceleration engine 612 can be a neural network accelerator, and, as such, may be able to perform the large scale, parallel computations of a neural network more efficiently than when the computations are performed by the processor 602. As another example, the acceleration engine 612 can be a GPU, and may be optimized to perform the computations needed for graphics rendering. Other examples of devices that can be implemented by the acceleration engine 612 include cryptographic accelerators, compression and decompression accelerators, 3-D accelerators, regular expression accelerators, security accelerators, and others.

In various examples, the acceleration engine 612 can execute program code to perform certain operations. For example, when the acceleration engine 612 is a neural network accelerator, the acceleration engine 612 can be programmed to execute a particular neural network, such as one that performs image recognition or one that performs machine translation. As a further example, to support the execution of a neural network, the acceleration engine 612 can be programed to perform operations such as copying data for the neural network from processor memory 604 (for example) into the acceleration engine 612, copying input data for the neural network from processor memory 604 into the acceleration engine 612, and/or copying results from the acceleration engine 612 into the processor memory 604, among other examples.

To generate program code for the acceleration engine 612, in various examples, the host system 600 can execute the compiler 630. Compilers, in general, are software programs that translate program code written in a human-readable language into a format (e.g., machine instructions) that can be read and processed by an integrated circuit device. In the example of FIG. 6, the acceleration engine 612 is a neural network accelerator and the compiler 630 is for compiling a neural network description into instructions to be executed on the acceleration engine 612. When the acceleration engine 612 implements a different type of accelerator, another compiler can be used.

The compiler 630 can be activated, for example, when the operating system 620 receives keyboard, mouse, touch-screen, voice commands, or other inputs from the Input/Output devices 608. The inputs can further include parameters for the compiler 630, such as the input code 642 to compile and configuration options for the compilation process. Once the compiler 630 is activated, the processor 602 can load the instructions for the compiler 630 into the processor memory 604, and can execute the instructions.

In the example of FIG. 6, the compiler 630 includes a first stage 632, a second stage 636, and a third stage 640, which each perform different operations to produce compiled code 644. In other examples, the compiler 630 can combine the operations of the first stage 632, second stage 636, and/or third stage 640 into fewer stages, or can divide the operations of one of the stages into multiple stages.

The first stage 632 can receive and process input code 642. The input code 642 can describe a program in a high-level programming language, such as Java, C++, or Tensorflow, among many other examples. The input code 642 can describe, for example, steps to perform image recognition, speech recognition, machine translation, or other operations. The input code 642 can be obtained, for example, from the storage device 606. Alternatively, though not illustrated here, the input code 642 may be located in the processor memory 604 or can be obtained from a network location, using the network interface 610. Processing of the input code 642 can include sorting the operations described in the input code 642 into layers, where the outputs of one layer provide the inputs to a next layer. Processing can also include identifying steps to be performed by the processor 602, rather than by the acceleration engine 612. For example, the processor 602, through the execution of a driver 622, may need to perform steps such as configuring Direct Memory Access (DMA) descriptors for moving data into or out of the acceleration engine 612, among other examples.

The output 634 of the first stage 632 can be organized, for example, in the layers, nodes, and connections between nodes of a neural network. The second stage 636 can perform intermediate processing on this output 634. For example, the operations performed in any one layer, or at any one node in a layer, may be too many for the acceleration engine 612 to perform at the same time. The acceleration engine 612 may, for example, have a limited amount of local storage space for the data needed for a computation, or the computations may be more than the acceleration engine 612 can perform at one time. In this example, the first stage 632 can break the operations of the layer or node down into smaller operations, which can fit into the acceleration engine's local memory and/or can fit into the computing capacity of the acceleration engine 612. Processing of the output 634 of the first stage 632 can include other steps, such as scheduling, or determining the order in which the acceleration engine 612 and/or processor 602 will perform operations, among other examples.

In various examples, the output 638 of the second stage 636 includes the various steps to be performed by components of the acceleration engine 612, in the order that the steps are to be performed. The output 638 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 640 can operate on the output 638 of the second stage 636, and perform various steps before producing the instructions that are to be executed by the acceleration engine 612. These steps can include, for example, removing redundant dependencies, resolving or handling dependencies between nodes by inserting synchronization instructions into the code, identifying possible optimizations in memory usage or memory bandwidth usage, and other operations.

The output of the third stage 640 is compiled code 644, which may include machine instructions in binary format. In some examples, the compiled code 644 can be stored in the processor memory 604. Alternatively or additionally, the compiled code 644 can be copied to the storage device 606 or to a network location. As noted above, the acceleration engine 612 may be located at a different host system, in which case the compiled code 644 can be sent over the network interface 610 to the other host system.

In the example of FIG. 6, the host system 600 can execute a driver 622, which can also be referred to as a device driver or runtime driver, that manages the acceleration engine 612. The driver 622 can provide an interface between applications executing on the host system 600 (or on another host system) and the acceleration engine 612. For example, the driver 622 can provide an Application Program Interface (API) that defines functions for feeding input data to the acceleration engine 612 and defining the operation to perform on the input data. In this and other examples, the driver 622 can configure the acceleration engine 612 to perform the operation. For example, the driver 622 can identify a neural network that the acceleration engine 612 is to execute, as well as the location in the processor memory 604 or on the storage device 606 where the compiled code 644 for the neural network is located. The driver 622 can further load into the acceleration engine 612 or cause the acceleration engine 612 to load the compiled code 644, can load or cause the acceleration engine 612 to load the input data on which the neural network is to operate, and/or can cause the acceleration engine 612 to begin executing on the input data. Once the acceleration engine 612 has finished, the acceleration engine 612 can notify the driver 622, and the driver 622 can deliver a result back to the application that requested the result.

Figure 7:
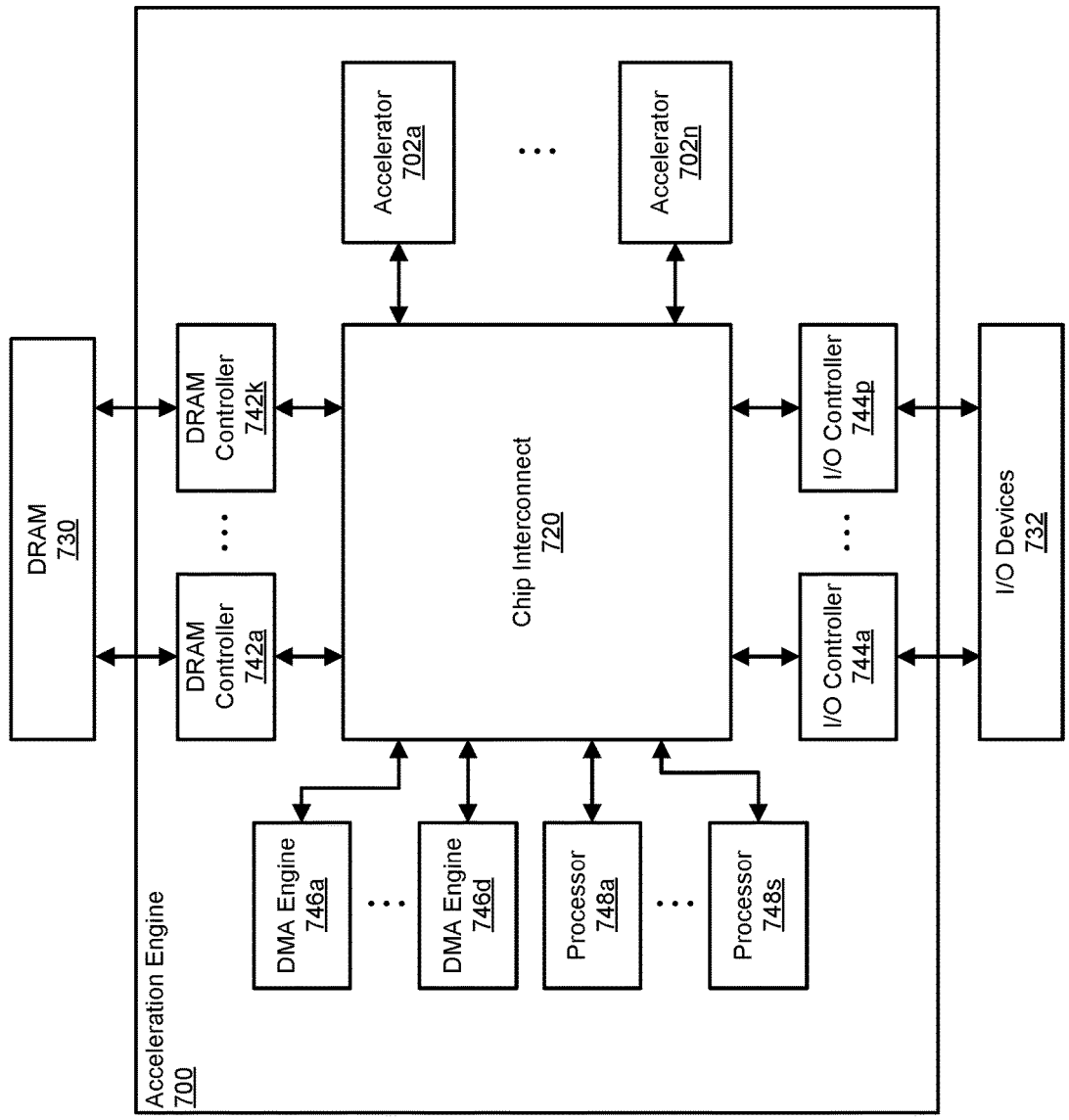
FIG. 7 illustrates a block diagram of an example of an acceleration engine.

FIG. 7 illustrates a block diagram of an example of an acceleration engine 700. The acceleration engine 700 is an example of an integrated circuit that can include one or more accelerators 702a-702n that may be similar to the accelerator illustrated in FIG. 8.

In the example of FIG. 7, the acceleration engine 700 includes multiple accelerators 702a-702n, each of which can perform a set of operations. In various examples, the accelerators 702a-702n are for particular types of operations, so that the accelerators 702a-702n can perform the operations much faster than when similar operations are performed by a general purpose processor. In various examples, to perform a set of operations, input data on which the operations are to be performed must first be moved into the accelerators 702a-702n. Additionally, in some cases, program code is also moved into the accelerators 702a-702n, which programs the operations that the accelerators 702a-702n will perform on the data. In the illustrated example, the acceleration engine 700 includes n accelerators 702a-702n. Examples of accelerators that can be included in the acceleration engine 700 include graphics accelerators, floating point accelerators, neural network accelerators, and others. In various examples, the accelerators 702a-702n can each be the same (e.g., each of the is a graphics accelerator) or can be different (e.g., the accelerators 702a-702n include a graphics accelerator, a floating point accelerator, and neural network accelerator).

The example acceleration engine 700 further includes DRAM controllers 742a-742k for communicating with an external memory. The external memory is implemented, in this example, using DRAM 730. In the illustrated example, the acceleration engine 700 includes k DRAM controllers 742a-742k, each of which may be able to communicate with an independent set of banks of DRAM. In other examples, other types of RAM technology can be used for the external memory. The DRAM controllers 742a-742k can also be referred to as memory controllers.

In various examples, input data and/or program code for the accelerators 702a-702n can be stored in the DRAM 730. Different programs can cause the accelerators 702a-702n to perform different operations. For example, when one of the accelerators is a neural network accelerator, one program can configure the neural network accelerator to perform speech recognition while another program can configure the neural network accelerator to perform image recognition. In various examples, different accelerators 702a-702n can be programmed with different programs, so that each performs a different set of operations. In various examples, the processors 748a-748s can manage moving of program code from the DRAM 730 to the accelerators 702a-702n.

The example acceleration engine 700 further includes I/O controllers 744a-744p for communicating with I/O devices 732 in the system. The acceleration engine 700 can communicate with I/O devices over, for example, a processor bus. In some examples, the processor bus can be implemented using Peripheral Component Interconnect (PCI) and/or a variation of the PCI bus protocol. The processor bus can connect the acceleration engine 700 to I/O devices such as, for example, input and output devices, memory controllers, storage devices, and/or network interface cards, among other things. In some examples, the I/O controllers 744-744p can enable the acceleration engine 700 to act as an I/O device for a host processor. For example, the acceleration engine 700 can be the recipient of input data from the host processor, and a command indicating an operation to be performed on the input data (e.g., a particular computation or analysis). In the illustrated example, the acceleration engine 700 includes p I/O controllers 744a-744p, each of which may include a separate root complex and may communicate with a separate set of I/O devices 732. In other examples, other standardized bus protocols, such as Ultra Path Interconnect (UPI) can be used for the host bus. In other examples, a proprietary bus protocol can be used.

Movement of data in the acceleration engine 700 can be managed by one or more processors 748a-748s, which can also be referred to as data management processors. In the example of FIG. 7, the acceleration engine 700 includes s processors 748a-748s incorporated into the device (e.g., on the same silicon die). In other examples, the processors 748a-748s can be external to the acceleration engine 700 (e.g., on a different die and/or in a different package). In some examples, the processors 748a-748s can manage the movement of data from I/O devices 732 to the accelerators 702a-702n or the DRAM 730. For example, input data may be located at an I/O device 732 or in processor memory, and the processors 748a-748s can move the input from the I/O device 732 or processor memory into an accelerator or into DRAM 730. As another example, program code for the accelerators 702a-702n may be located on an I/O device 732 or in processor memory.

The example acceleration engine 700 further includes DMA engines 746a-746d that can move data between the accelerators 702a-702n, DRAM controllers 742a-742k, and I/O controllers 744a-744p. In the illustrated example, the acceleration engine 700 includes d DMA engines 746a-746d. In some implementations, the DMA engines 746a-746d can be assigned to specific tasks, such as moving data from the DRAM controllers 742a-742d to the accelerators 702a-702n, or moving data between the I/O controllers 744a-744p and the accelerators 702a-702n. These tasks can be assigned, for example, by enqueueing descriptors with the DMA engines 746a-746d, where a descriptor identifies an address for a block of data and an operation (e.g., a read or a write) to perform. A descriptor, for example, can direct a DMA engine to instruct a DMA controller to read a block of data from DRAM 730. A descriptor can, as a further example, instruct the DMA engine to write data, read by the DMA controller, to an accelerator. Further descriptors can be used to move data from an accelerator to DRAM 730.

In various examples, each of the processors 748a-748s can be responsible for managing the data movement for a different accelerator. In some examples, a processor may manage the data movement for more than one accelerator. Similarly, in various examples, each of the processors 748a-748s can be assigned to one or more DMA engines 746a-746d. In these and other examples, associations between processors 748a-748s, accelerators 702a-702n, and DMA engines 746a-746d are determined by program code being executed by each respective processor.

In the example acceleration engine 700, the various components can communicate over a chip interconnect 720. The chip interconnect 720 primarily includes wiring for routing data between the components of the acceleration engine 700. In some cases, the chip interconnect 720 can include a minimal amount of logic, such as multiplexors to control the direction of data, flip-flops for handling clock domain crossings, and timing logic.

Figure 8:
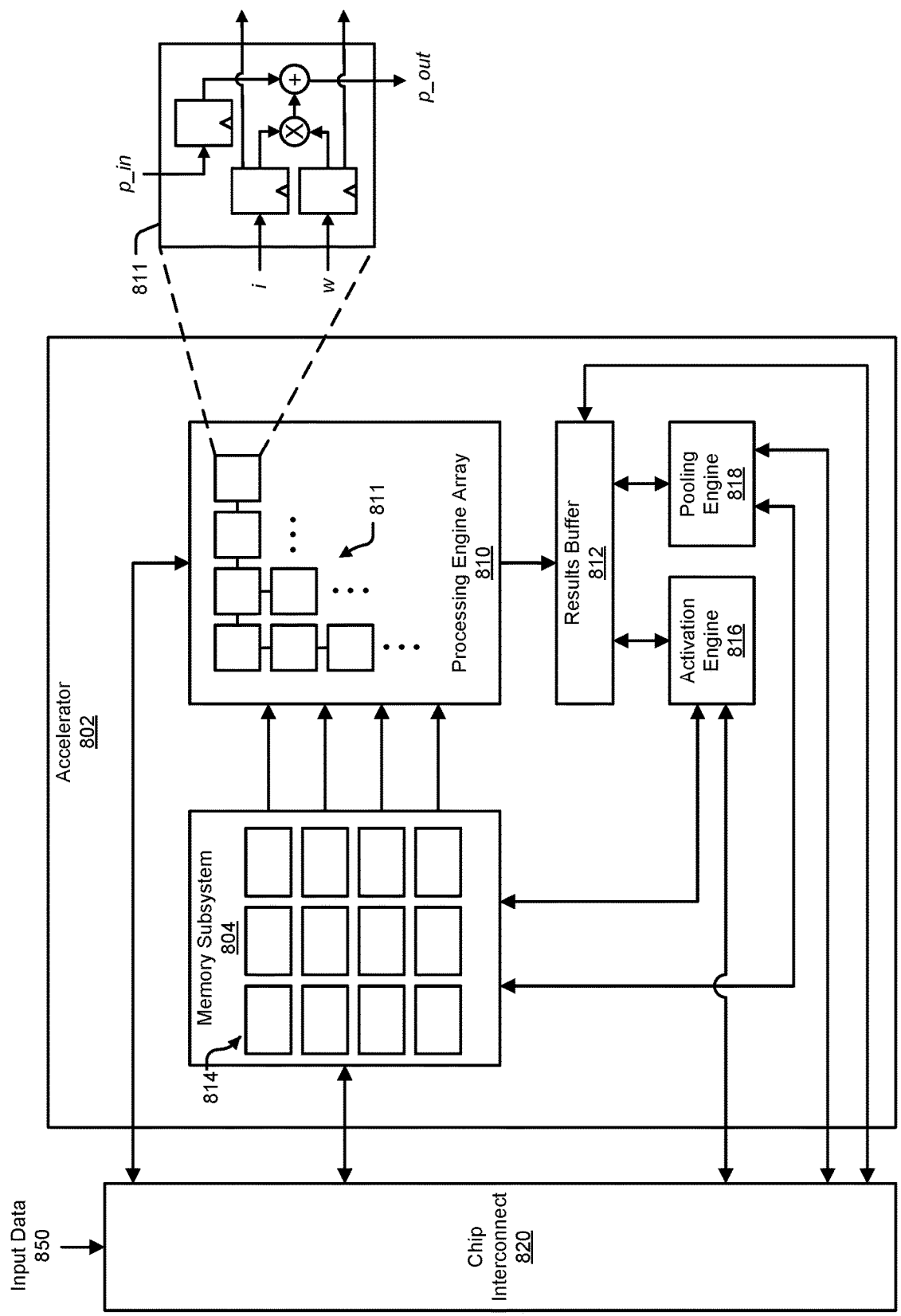
FIG. 8 illustrates a block diagram of an example of an integrated circuit device.

FIG. 8 illustrates a block diagram of an example of an integrated circuit device. The example of FIG. 8 illustrates an accelerator 802. In various examples, the accelerator 802, for a set of input data (e.g., input data 850), can execute computations using a processing engine array 810, an activation engine 816, and/or a pooling engine 818. In some examples, the example accelerator 802 may be an integrated circuit component of a processor, such as a neural network processor. The processor may have other integrated circuit components, including additional accelerator engines.

In various implementations, the memory subsystem 804 can include multiple memory banks 814. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time.

Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816 and the pooling engine 818 can include multiple execution channels, each of which can be separate memory clients. The memory banks 814 can be implemented, for example, using static random access memory (SRAM).

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hard wired to receive values from columns of the processing engine array 810, with one memory bank receiving data for each column.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 428 rows, or some other number of columns and rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, pin, provided either from another processing engine 811 or from a previous round of computation by the processing engine array 810. When starting a computation for a new set of input data, the top row of the processing engine array 810 can receive a fixed value for p_in, such as zero. As illustrated by this example, i and w are multiplied together and the result is summed with p_in to produce a new partial sum, p_out, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814 can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operating on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

Herein, the activation engine 816 and the pooling engine 818 may be referred to collectively as execution engines. The processing engine array 810 is another example of an execution engine. Another example of an execution engine is a Direct Memory Access (DMA) engine, which may be located outside the accelerator 802.

Input data 850 can arrive over the communication fabric 820. The communication fabric 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816 and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

What is claimed is:

1. A method of reducing a compilation time for compiling a neural network, the method comprising:
   identifying a plurality of operators based on a description of the neural network;
   forming a plurality of subgraphs each including one or more operators of the plurality of operators;
   determining a compute usage and a memory usage associated with the one or more operators included in each of the plurality of subgraphs;
   for each subgraph of the plurality of subgraphs, based on the compute usage and the memory usage, either:
      performing, during compilation of the neural network and prior to execution of machine instructions for the neural network on a target processor, a set of compute optimizations for the subgraph and not performing a set of memory optimizations for the subgraph to reduce the compilation time; or
      performing, during the compilation of the neural network and prior to the execution of the machine instructions for the neural network on the target processor, the set of memory optimizations for the subgraph and not performing the set of compute optimizations for the subgraph to reduce the compilation time; and
   after performing either the set of compute optimizations or the set of memory optimizations for each of the plurality of subgraphs, generating the machine instructions for the neural network to be executed on the target processor.

2. The method of claim 1, further comprising:
   for each subgraph of the plurality of subgraphs, based on the compute usage and the memory usage, either:
      classifying the subgraph as a compute bound subgraph; or
      classifying the subgraph as a memory bound subgraph.

3. The method of claim 1, further comprising:
   identifying a set of optimizations to be applied to the neural network; and
   classifying each of the set of optimizations as a memory optimization or a compute optimization to produce the set of memory optimizations and the set of compute optimizations, wherein each optimization is classified as a memory optimization if the optimization improves memory usage or as a compute optimization if the optimization improves compute usage.

4. The method of claim 1, wherein it is determined whether to not perform the set of memory optimizations or the set of compute optimizations for the subgraph based on a memory capability and a compute capability of the target processor on which the plurality of operators are to be executed.

5. The method of claim 1, further comprising:
   receiving, by a compiler, the description of the neural network.

6. A non-transitory computer-readable medium having stored therein instructions that, when executed by one or more processors, cause the one or more processors to perform operations for reducing a compilation time for compiling a neural network, the operations comprising:
   identifying a plurality of operators based on a description of a neural network;
   forming a plurality of subgraphs each including one or more operators of the plurality of operators;
   determining a compute usage and a memory usage associated with the one or more operators included in each of the plurality of subgraphs;
   for each subgraph of the plurality of subgraphs, based on the compute usage and the memory usage, either:
      performing, during compilation of the neural network and prior to execution of machine instructions for the neural network on a target processor, a set of compute optimizations for the subgraph and not performing a set of memory optimizations for the subgraph to reduce a compilation time; or
      performing, during the compilation of the neural network and prior to the execution of the machine instructions for the neural network on the target processor, the set of memory optimizations for the subgraph and not performing the set of compute optimizations for the subgraph to reduce the compilation time; and
   after performing either the set of compute optimizations or the set of memory optimizations for each of the plurality of subgraphs, generating the machine instructions for the neural network to be executed on the target processor.

7. The non-transitory computer-readable medium of claim 6, wherein the operations further comprise:
   for each subgraph of the plurality of subgraphs, based on the compute usage and the memory usage, either:
      classifying the subgraph as a compute bound subgraph; or
      classifying the subgraph as a memory bound subgraph.

8. The non-transitory computer-readable medium of claim 6, wherein the operations further comprise:
   identifying a set of optimizations to be applied to the neural network; and
   classifying each of the set of optimizations as a memory optimization or a compute optimization to produce the set of memory optimizations and the set of compute optimizations, wherein each optimization is classified as a memory optimization if the optimization improves memory usage or as a compute optimization if the optimization improves compute usage.

9. The non-transitory computer-readable medium of claim 6, wherein it is determined whether to not perform the set of memory optimizations or the set of compute optimizations for the subgraph based on a memory capability and a compute capability of the target processor on which the plurality of operators are to be executed.

10. The non-transitory computer-readable medium of claim 6, wherein the operations further comprise:
receiving, by a compiler, the description of the neural network.

11. A system comprising:
one or more processors; and
a computer-readable medium having stored therein instructions that, when executed by the one or more processors, cause the one or more processors to perform operations for reducing a compilation time for compiling a neural network, the operations comprising:
identifying a plurality of operators based on a description of a neural network;
forming a plurality of subgraphs each including one or more operators of the plurality of operators;
determining a compute usage and a memory usage associated with the one or more operators included in each of the plurality of subgraphs;
for each subgraph of the plurality of subgraphs, based on the compute usage and the memory usage, either:
performing, during compilation of the neural network and prior to execution of machine instructions for the neural network on a target processor, a set of compute optimizations for the subgraph and not performing a set of memory optimizations for the subgraph to reduce the compilation time; or
performing, during the compilation of the neural network and prior to the execution of the machine instructions for the neural network on the target processor, the set of memory optimizations for the subgraph and not performing the set of compute optimizations for the subgraph to reduce the compilation time; and
after performing either the set of compute optimizations or the set of memory optimizations for the subgraph, generating the machine instructions for the neural network to be executed on the target processor.

12. The system of claim 11, wherein the operations further comprise:
for each subgraph of the plurality of subgraphs, based on the compute usage and the memory usage, either:
classifying the subgraph as a compute bound subgraph; or
classifying the subgraph as a memory bound subgraph.

13. The system of claim 11, wherein the operations further comprise:
identifying a set of optimizations to be applied to the neural network; and
classifying each of the set of optimizations as a memory optimization or a compute optimization to produce the set of memory optimizations and the set of compute optimizations, wherein each optimization is classified as a memory optimization if the optimization improves memory usage or as a compute optimization if the optimization improves compute usage.

14. The system of claim 11, wherein it is determined whether to not perform the set of memory optimizations or the set of compute optimizations for the subgraph based on a memory capability and a compute capability of the target processor on which the plurality of operators are to be executed.

* * * * *